June 4, 1946.   R. F. MURPHY   2,401,435
STORAGE BATTERY PLATE
Filed June 11, 1943

INVENTOR:-
ROSS F. MURPHY
BY
Augustus B. Stoughton
ATTORNEY

Patented June 4, 1946

2,401,435

UNITED STATES PATENT OFFICE 2,401,435

STORAGE BATTERY PLATE

Ross F. Murphy, Lansdale, Pa., assignor to The Electric Storage Battery Company, a corporation of New Jersey Application June 11, 1943, Serial No. 490,398

7 Claims. (Cl. 136—55)

This invention relates to storage battery plates or electrodes, and especially to such plates of the tubular type comprising a series of parallel pencils of active material having axial conducting spines connected to top and bottom bars, said pencils surrounded by porous tubular retainers of insulating material, such as hard rubber or synthetic resin.

It is customary to provide the tubular retainers, on opposite sides, with longitudinal spacing ribs projecting from the plate surface against the confronting surface of the adjacent separator, thus defining a series of vertical channels to permit any dislodged active material to sift down to the bottom of the cell.

As heretofore designed, the bottom bar is narrower than the overall diameter of the tubular retainers over the ribs and is defined by smooth vertical surfaces extending longitudinally and confronting but spaced from the lower edges of the adjacent separators. With such construction it sometimes occurs that the separator, near its lower edge, will curl under the lower ends of the retainer ribs and against the vertical surface of the bottom bar, thus closing the lower ends of the channels and permitting dislodged active material to accumulate and pile up in the channels. Such active material from the positive plate, in combination with the electrolytic action during the charging period, has a very strong oxidizing effect on the separator, finally causing a puncture and, by bridging across to the negative plate, producing a short circuit.

A further difficulty arising from such deformation of the separator lies in the fact that the lower edge of the separator is no longer held against the surface of the adjacent negative plate, thus permitting the negative active material to swell and become dislodged from the negative plate.

It is an object of this invention to overcome the difficulties above cited by providing a bottom bar having vertical ribs projecting from its lateral surfaces, said ribs disposed in alignment with the ribs of the tubular retainer to provide a continuation of said retainer ribs to the lower edges of the plate and the separator, thus preventing the latter from curling under and closing the channels and leaving the confronting negative active material without support.

This invention will be more fully understood from the following description taken in connection with the accompanying drawing in which.

Figure 1:
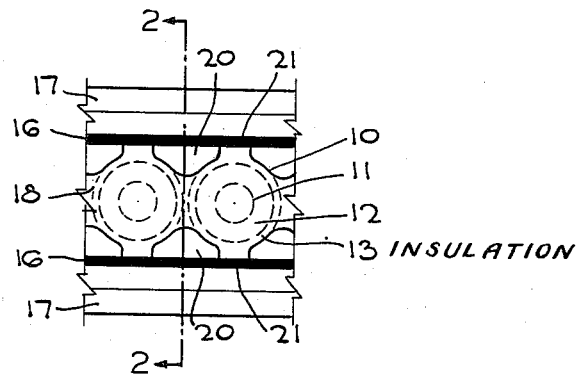
Figure 1 is a fragmental bottom plan view of a storage battery element (plate and separator group) embodying features of the invention.
Figure 4:
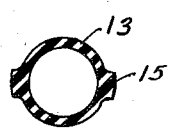
Figure 4 is a horizontal section of the tubular retainer.

Referring to the drawing, 10 represents the pencil of a tubular type storage battery plate comprising an axial conducting spine 11 surrounded by active material 12, the latter enclosed in a tubular retainer 13. The retainer 13 is provided with a series of closely spaced slots 14 extending from opposite points of the periphery of the tube part way toward the center, said slots terminating at longitudinal ribs 15 which ribs project from the lateral surfaces of the plate and confront the surface of the adjacent diaphragm separators 16. Thus the slots extend through the retainer wall between the ribs. At 17 is shown the negative plates on either side of the positive.

The assembled element comprising intermeshed positive and negative plates and separators is supported in any well known manner in electrolyte in the usual container, not shown, leaving space below for the accommodation of any sediment dislodged in service from the plates.

Figure 2:
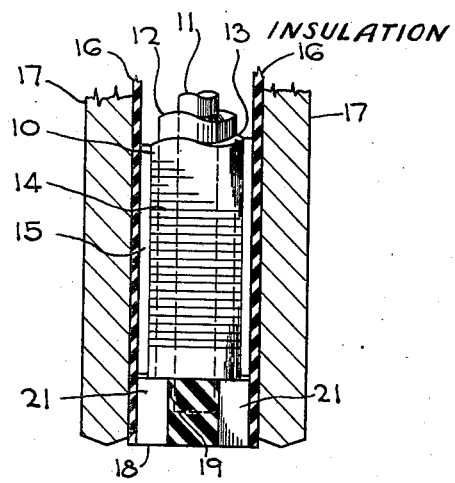
Figure 2 is a sectional elevation on the line 2—2 of Figure 1.
Figure 3:
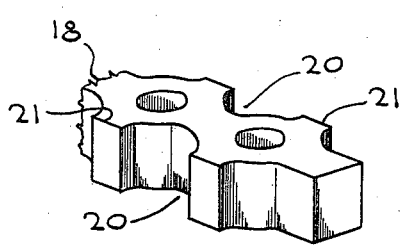
Figure 3 is a perspective view of the bottom bar shown in Figures 1 and 2.

The positive plate is provided with a bottom bar 18 constructed in accordance with this invention. Its upper surface contacts or projects into and closes the lower ends of the tubular retainers 13. The axial conducting spines 11 are imbedded in the bottom bar in the usual manner, as indicated at 19 (Figure 2). Between the lower ends of the tubular retainers the bottom bar is recessed to provide vertical channels 20. The bottom bar is also provided with transverse ribs 21 which are disposed in alignment with the ribs 15 of the tubular retainers. The laterally facing exposed surfaces of the bottom bar ribs 21 lie in the same plane as that of the laterally facing exposed surfaces of the retainer ribs 15, so that these two surfaces provide a continuous abutment for the diaphragm separator 16 all the way down to the lower edge of said separator, thus holding the latter firmly against the surface of the negative plate and preventing it from curling under the lower edges of the tubular retainers and obstructing the channels 20.

From the foregoing it will be observed that I have provided improved yet relatively inexpensive means for insuring an unobstructed path to the lower portion of a battery jar or container for the particles of positive active material which pass through the slots in the tube 13 during use of the plate group. The accumulation of active material adjacent the lower edges of the separator diaphragm 16 and the deleterious effect of such accumulations are thereby eliminated.

While a specific embodiment of this invention has been disclosed, modifications therein will be apparent to those skilled in the art. It is therefore intended by the appended claims to cover not only the specific embodiment but also such modifications thereof as come within the true spirit and scope of this invention.

I claim:

1. In a storage battery cell provided with positive plates of the tubular type and negative plates of the flat type with intermeshed separators whose lower edges are adjacent the level of the lower edges of the positive plates, each of the positive plates provided with a bottom bar abutting the lower ends of the tubes, the combination with each of the positive plates of a series of vertical parallel ribs projecting from the plate surface and, in superficial alignment therewith, from the lateral faces of the bottom bar, said ribs defining a series of superficial vertical channels extending unobstructedly and of substantially uniform sectional configuration from the top to the bottom of the plate including the bottom bar, whereby the adjacent separator is firmly held down to its lower edge, against the confronting surface of the adjacent negative plate and out of the path of the channels.

2. In a storage battery cell provided with plates of the tubular type confronted by separators extending to near the lower edges of the plates, each of said plates comprising a series of cylindrical pencils of active material mounted on axial conducting spines and enclosed in tubular perforated retainers of insulating material provided with longitudinal spacing ribs projecting from opposite sides of their walls against the confronting separator, the combination with said pencils of a bottom bar connecting the projecting ends of the spines and contacting and closing the lower ends of the retainers, said bottom bar provided with ribs projecting from its lateral surfaces and confronting the lower edges of the separators, said ribs constituting a uniform continuation of the ribs of the tubular retainers substantially identical in sectional configuration therewith down to the lower edge of said bar.

3. In a storage battery cell provided with positive plates of the tubular type and negative plates of the flat type with intermeshed separators whose lower edges are adjacent the lower edges of the positive plates, said positive plates comprising a series of parallel pencils provided with longitudinal ribs projecting from the plate surface against the adjacent separator and defining intervening vertical channels, the combination with said series of pencils of a bottom bar provided with transverse ribs in alignment with the ribs of the pencils, the exposed surfaces of both sets of ribs lying in one plane, whereby the adjacent separator down to its lower edge is held against the confronting negative plate and out of the path of the channels.

4. In a storage battery plate of the type comprising a series of cylindrical pencils of active material mounted on axial conducting spines and enclosed in tubular perforated retainers of insulating material provided with longitudinal spacing ribs projecting from opposite sides of their walls, the combination with said pencils of a bottom bar connecting the projecting ends of the spines and contacting and enclosing the lower ends of the retainers, said bottom bar provided with narrow ribs projecting from its lateral surfaces in alignment with the ribs of the retainers and substantially uniformly identical in sectional configuration therewith.

5. In a storage battery plate, the combination of pencils of active material comprising a series of parallel cylindrical pencils of active material provided with axial conducting spines and enclosed in tubular porous retainers provided with longitudinal ribs projecting from the plate surface, and a bottom bar attached to the lower ends of the spines and closing the lower ends of the retainers, said bottom bar provided with transverse ribs in alignment with the ribs of the tubular retainers to form with the latter a series of continuous parallel ribs extending to the lower edge of the plate and whose exposed laterally facing surfaces lie in a single plane.

6. In a storage battery cell the combination of a positive plate of the tubular type having a bottom bar, a negative plate of the flat type, a series of vertical parallel ribs projecting from the vertical surface of the positive plate including the bottom bar and forming channels extending from the top to the bottom of said plate, the exposed surfaces of said ribs over the entire plate including the bottom bar lying in one plane substantially parallel to the median plane of the positive plate, and a separator interposed and clamped between the surface of the negative plate and the surface of the faces of the ribs including the ribs on the bottom bar, whereby deformation or curling of the lower portion of the separator into said channels between said ribs is opposed.

7. In a storage battery cell provided with plates of the tubular type confronted by separators extending to near the lower edges of the plates, each of said plates comprising a series of cylindrical pencils of active material mounted on axial conducting spines and enclosed in tubular perforated retainers of insulating material provided with longitudinal spacing ribs projecting from opposite sides of their walls against the confronting separator and spaced apart, the combination with said pencils of a bottom bar connecting the projecting ends of the spines and contacting and closing the lower ends of the retainers, said bottom bar having parallel edge spaces conforming to the contour of the end of the tube and provided with ribs aligned with and forming a continuation of the ribs projecting from the tubular retainer and having between said portions comparatively narrow elongations or necks providing concavities constituting open channels and confronting the lower edge of the separators.

ROSS F. MURPHY.